(12) United States Patent
Miyazaki

(10) Patent No.: US 9,025,106 B2
(45) Date of Patent: May 5, 2015

(54) LIQUID CRYSTAL DISPLAY DEVICE

(71) Applicant: Japan Display Inc., Tokyo (JP)

(72) Inventor: Hiroyuki Miyazaki, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 14/107,382

(22) Filed: Dec. 16, 2013

(65) Prior Publication Data

US 2014/0176872 A1 Jun. 26, 2014

(30) Foreign Application Priority Data

Dec. 20, 2012 (JP) ................................. 2012-278309

(51) Int. Cl.
*G02F 1/1333* (2006.01)
*F21V 8/00* (2006.01)
*G02F 1/1335* (2006.01)

(52) U.S. Cl.
CPC ........ *G02B 6/0088* (2013.01); *G02F 1/133615* (2013.01); *G02F 1/133305* (2013.01); *G02F 1/133605* (2013.01); *G02B 6/0085* (2013.01)

(58) Field of Classification Search
CPC ....................... G02F 1/33308; G02F 1/133608
USPC .......................................................... 349/58
See application file for complete search history.

(56) References Cited

U.S. PATENT DOCUMENTS

2008/0043171 A1 2/2008 Takahashi et al.

FOREIGN PATENT DOCUMENTS

JP 2008-46430 A 2/2008

*Primary Examiner* — Phu Vu
(74) *Attorney, Agent, or Firm* — Ulmer & Berne LLP

(57) ABSTRACT

Occurrence of an event can be prevented, whereby, when a backlight expands with heat, a light guide plate might move a group of optical sheets into contact with a middle frame and deform the sheets, thereby causing nonuniformity of luminance on a screen. In particular, a protrusion is formed at an edge of the plate, and the sheets are mounted on the plate to avoid the protrusion. The frame covers the protrusion and the edge of the sheets. Even if a spatial gap with respect to the frame is lost by expansion of the plate, the sheets suffer no deformation due to interference between an edge of the sheets and the frame. Therefore, the nonuniformity of luminance on the screen does not occur, either. Also, unusual sounds due to movement of the plate under vibration do not arise since a gap between the protrusion and the frame can be small.

4 Claims, 6 Drawing Sheets

A-A

LIQUID CRYSTAL DISPLAY DEVICE

CLAIM OF PRIORITY

The present application claims priority from Japanese Patent Application JP 2012-278309 filed on Dec. 20, 2013, the content of which is hereby incorporated by reference into this application.

BACKGROUND OF THE INVENTION

1. Field of the Invention

The present invention relates generally to liquid crystal display devices, and more particularly to a vehicular, compact liquid crystal display device slimmed down in bezel region size for increased display region.

2. Description of the Related Art

A conventional liquid crystal display device include: a thin-film transistor (TFT) substrate formed with pixel electrodes, TFTs, and other elements in matrix form; a counter substrate disposed in facing relation with respect to the TFT substrate and formed with a color filter and other elements at locations corresponding to the pixel electrodes on the TFT substrate; and liquid crystals arranged between the TFT substrate and the counter substrate. The display device forms images by controlling, on a pixel-by-pixel basis, transmittance of light formed by the liquid-crystal molecules.

Liquid crystal display devices can be made compact and lightweight, so that their applications are expanding in a wide variety of products, including TVs, cell phones, and many more. Recently, they also are commonly used as vehicle-mounted types of displays. For vehicular application, since vibration and the like are exerted, they require more effective anti-vibration preventive measures than those required in a normal type of liquid crystal display device.

In addition to being exposed to a vibration-prone environment, vehicular types of liquid crystal display devices are used in a wide environmental temperature range from −30° C. to +85° C. Heat-related preventives are therefore necessary. Optical sheets, in particular, have a problem in that it swelling or waviness is caused by thermal expansion under a high-temperature atmosphere, the sheet will not return to a normal stare even after being cooled down. By way of example for comparison, displays for medical monitors range between 0° C. and +60° C. in operating environmental temperature.

Vehicular liquid crystal display devices further need to be placed in a limited space. Since liquid crystals do not emit light themselves, a backlight is disposed in the back of a liquid crystal display panel. Disposing the backlight in a limited space requires downsizing a light source, so light-emitting diodes (LEDs) are used as the light source. These LEDs are arranged on a side of a light guide plate, then various optical sheets are arranged on the light guide plate, and these optical parts are accommodated in a mold, whereby the backlight is constructed.

JP-A-2008-46430 describes a configuration that includes a light guide plate having a sloped surface to increase the amount of incidence of light from LEDs by arranging the LEDs on a side of the light guide plate that is thicker than any other section of the light guide plate.

SUMMARY OF THE INVENTION

For vehicular liquid crystal display devices, there is also the strong demand to increase only a display region size while maintaining a constant entire outline. In normal liquid crystal display devices, the backlight is disposed in a resin mold, whereas in vehicular liquid crystal display devices, the backlight is rested in a metal-formed middle frame and lower frame to make the outline of the device smaller.

Additionally, vehicular liquid crystal display devices need to provide high luminance compared with other liquid crystal display devices. Implementation of this, on the other hand, involves more consumption of electric power in the LEDs that form the light source, and hence a greater deal of heat emission from the LEDs. The backlight is preferably placed in a metal to release the LED-emitted heat more efficiently.

FIG. 8 shows an example of a plan view of a conventional vehicular liquid crystal display device. The liquid crystal display device in FIG. 6 has an outline covered with a metal-formed upper frame 20. A display region 300 of a liquid crystal display panel is forced internally to the upper frame 20. A backlight not shown is formed in the back of the liquid crystal display panel. Referring to FIG. 8, a clearance from an outer edge or the display region to that of the upper frame, that is, a bezel is greater on short sides of the upper frame than on long sides thereof. In a configuration like this one, LEDs that form a light source are arranged near the short sides of the upper frame. Conversely in a case that a large bezel can be formed at the long sides, LEDs that form the light source are arranged near the long sides.

FIG. 9 is a cross-sectional view of section A-A of the conventional vehicular liquid crystal display device, shown in FIG. 8. Referring to FIG. 9, a TFT substrate 100 and a counter substrate 200 are bonded together via a sealing material not shown, and liquid crystals not shown are interposed between the TFT substrate 100 and the counter substrate 200. A lower polarizer 101 is attached to a lower surface of the TFT substrate 100, and an upper polarizer 201 to an upper surface of the counter substrate 200. A combination of the TFT substrate 100, the counter substrate 200, the lower polarizer 101, and the upper polarizer 201, is referred to as the liquid crystal display panel.

The TFT substrate 100 is formed more largely than the counter substrate 200, and a section of the TFT substrate 100 that lies as one sheet of material, serves as a terminal section. An IC driver 60 is mounted on the terminal section. In addition, a flexible wiring substrate 80 for supplying electric power and signals is connected to the liquid crystal display panel. A backlight is disposed in the back of the liquid crystal display panel. The backlight is interposed between a middle frame 30 and a lower frame 40. Although a light source for the backlight is not shown, a plurality of LEDs are arranged on side faces of a light guide place 10.

Referring to FIG. 9, a reflecting sheet 12 is placed on the lower frame 40, and the light guide plate 10 is placed on the reflecting sheet 12. The reflecting sheet 12 and the light guide plate 10 work to direct LED-emitted incident light from the side faces of the light guide plate 10 so the liquid crystal display panel. Optical sheets, including a diffusion sheet and a prism sheet, are mounted on the light guide plate 10. The optical sheets 18 function to raise utilization efficiency of the light, to reduce nonuniformity in luminance of the backlight, and to minimize moiré. The flexible wiring substrate 80, connected to the terminal section of the liquid crystal display panel, extends to the rear of the lower frame 40 and is connected to a printed wiring substrate 90 via a connector 81. The printed wiring substrate 90 is protected with a substrate cover 50 formed of a metal. A combination of such liquid crystal display panel and backlight as shown in FIG. 9 is hereinafter called the liquid crystal display device.

FIG. 10 is a cross-sectional view of the liquid crystal display device, the view obtained by magnifying the light guide plate 10, optical sheets 18, middle frame 30, and lower frame 40 shown in FIG. 9. Referring to FIG. 10, a spatial gap g2 is present between the middle frame 30 and the optical sheets 18 under which the light guide plate 10, the reflecting sheet 12, and the lower frame 40 are arranged in that order.

When the liquid crystal display device is operated, however, various parts of the backlight expand with the LED-emitted heat or with heat from an engine side of a vehicle equipped with the display device. Thermal expansion coefficients are greater in resins than in metals. For example, the middle frame is formed from stainless steel, the lower frame from aluminum, and the light guide plate 10 and the optical sheets 18 from polycarbonate. The light guide plate 10, in particular, expands and when the gap g2 shown in FIG. 10 becomes lost, the light guide plate 10 brings the optical sheets 18 into contact with the middle frame 30.

Meanwhile, the optical sheets 18 normally expand with heat in a planar direction as well. However, since the optical sheets 18 are held down at their edges between the middle frame 30 and the light guide plate 10, the optical sheets 18 actually cannot expand in the planar direction and consequently as shown in FIG. 11, the optical sheets 18 suffer deformation such as corrugation. The deformation of the optical sheets 10 causes the nonuniformity of luminance on a display screen.

Even in the conventional device structure of FIG. 9, the event that the light guide plate 10 thermally expands and brings the optical sheets 18 into contact with the middle frame 30 is avoidable if the gap g2 between the optical sheets 18 and the middle frame 30, shown in FIG. 10, is increased. If the gap g2 in FIG. 10 is increased, however, this makes the light guide plate 10 easily movable in its planar direction within the lower frame 40, and if the liquid crystal display device vibrates during a travel of the vehicle, this vibration moves the light guide plate 10, thus causing vibration sounds.

An object of the present invention is to prevent the movement of the light guide plate 10 due to vibration and at the same time to avoid distortion of the optical sheets 16 by preventing the light guide light 10 from moving the optical sheets 18 into contact with the middle frame 30, and thereby prevent the nonuniformity of luminance on the screen from occurring.

The present invention addresses the above problems. The following outlines a more specific way to implement the conquest.

A liquid crystal display device includes a liquid crystal display panel and a backlight. The backlight includes a light guide plate and a group of optical sheets which are disposed within a lower frame, the light guide plate being mounted on the light guide plate, the backlight including a middle frame covering an edge of the optical sheets and that of the light guide plate. The light guide plate is rectangular and formed with a protrusion at each of four corners thereof. A spatial gap g1 between a front end of each protrusion of the light guide plate and a lower surface of the middle frame is smaller than a spatial gap g2 present between an upper surface of the optical sheets and the lower surface of the middle frame.

(2) The liquid crystal display device described in item (1) above, wherein the optical sheets are each notched at positions corresponding to the protrusions formed at the corners of the light guide plate.

(3) The liquid crystal display device described in item (2) above, wherein the gap between the front ends of the protrusions of the light guide plate and the lower surface of the middle frame is 0.05 to 0.20 mm.

(4) The liquid crystal display device described in item (1) above, wherein the liquid crystal display panel is mounted on the middle frame via a cushioning spacer.

In accordance with the present invention, the protrusions at the four corners of the light guide plate prevent the light guide plate from moving the optical sheets into contact with the middle frame and distorting the optical sheets, and thereby prevent nonuniformity of luminance on a display screen from occurring.

In addition, in accordance with the present invention, the gap between the middle frame and the light guide plate or the protrusions of the light guide plate does not need to be increased, which prevents the light guide plate iron; moving or generating vibration sounds, even in case of vibration.

DESCRIPTION OF THE PREFERRED EMBODIMENT

Hereunder, details of the present invention will he described with reference to an embodiment.

First Embodiment

Figure 1:
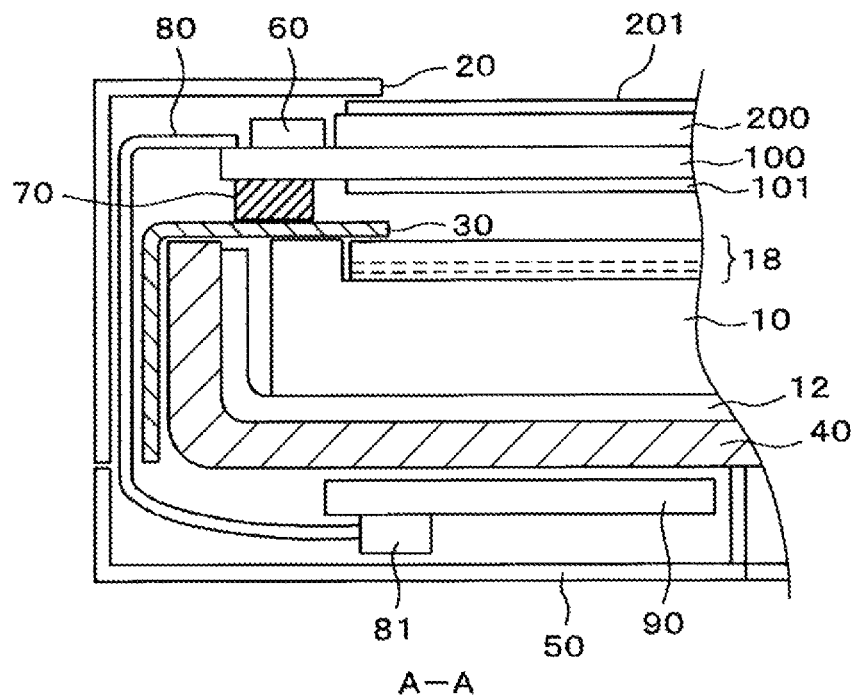
FIG. 1 is a sectional view of a liquid crystal display device embodying the present invention.
Figure 8:
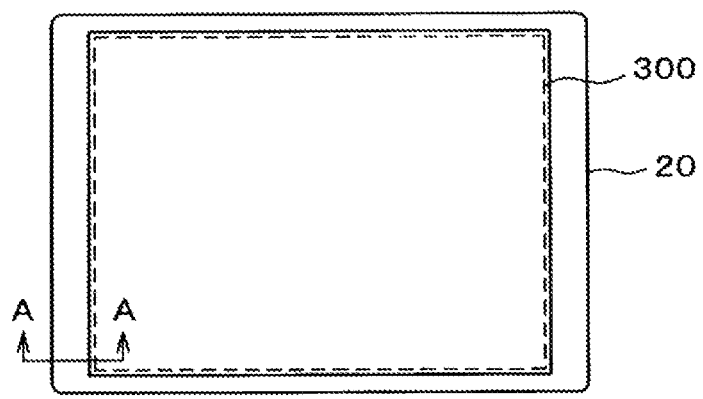
FIG. 8 is a plan view showing an example of a liquid crystal display device to which the invention is applied.
Figure 9:
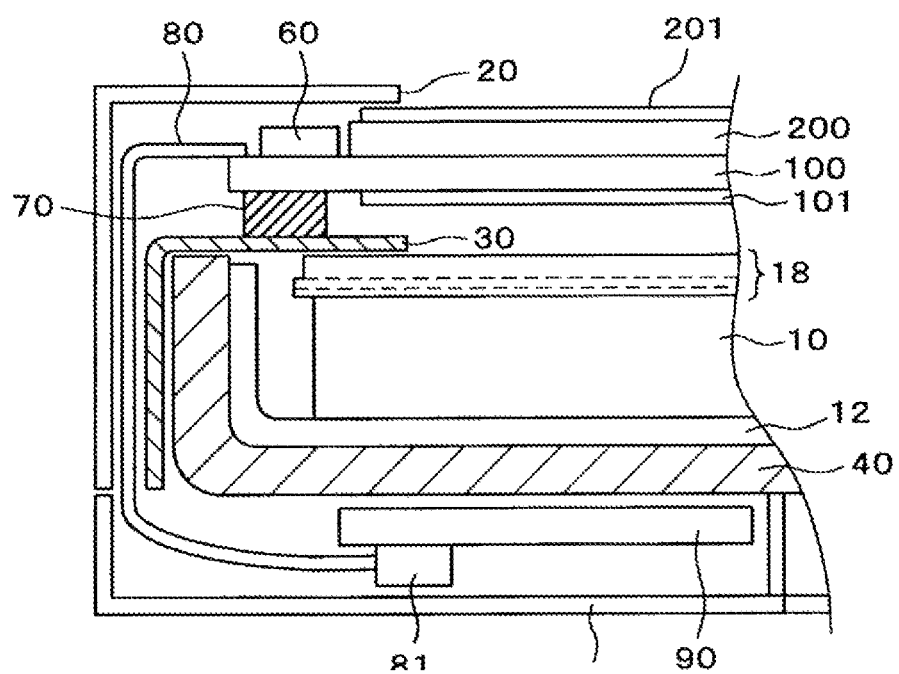
FIG. 9 is a sectional view of a conventional liquid crystal display device.
Figure 10:
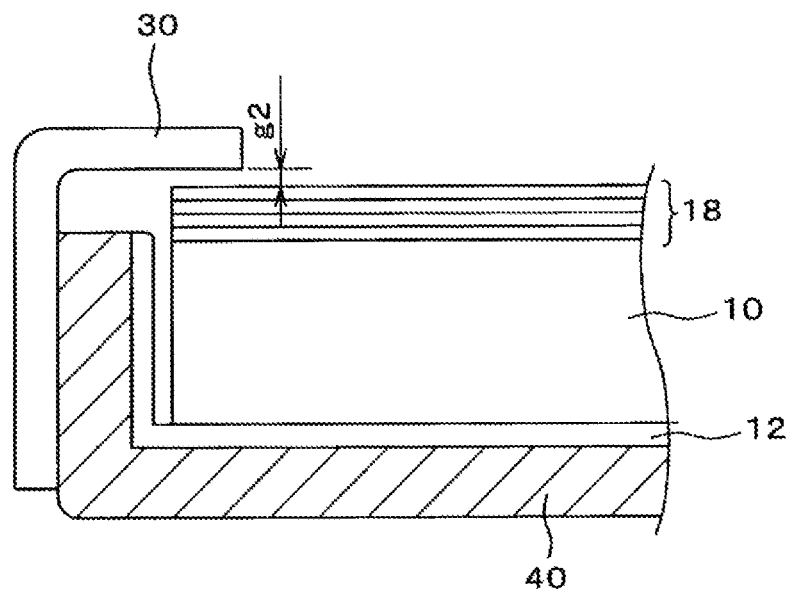
FIG. 10 is a sectional view showing a middle frame, light guide plate, and optical sheets as used in the conventional liquid crystal display device shown by way of example in FIG. 9.
Figure 11:
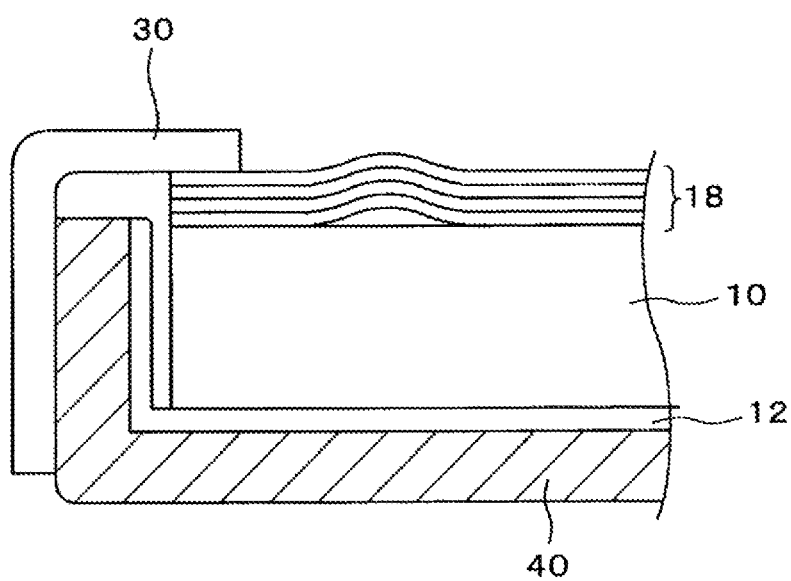
FIG. 11 is a sectional view that shows problems associated with the conventional liquid crystal display device shown by way of example in FIG. 9.

FIG. 1 is a sectional view of a liquid crystal display device embodying the present invention. FIG. 1 shows section A-A of the liquid crystal display device shown in FIG. 8. Description of FIG. 8 is omitted here since the figure has already been described earlier in this specification. Referring to FIG. 1, a backlight, disposed in a middle frame 30 and a lower frame 40, is present in the back of the liquid crystal display device, and the backlight is covered in its entirety with an upper frame 20. In these respects, the liquid crystal display device is the same as that described in FIG. 9. An IC driver 60 is disposed at a terminal section of a TFT substrate 100, a flexible wiring substrate 80 is connected to the terminal section, and the flexible wiring substrate 80 extends near the back of the lower frame 40 and is connected to a printed wiring substrate 90 in the back of the lower frame 40 via a connector 81. In these respects, the liquid crystal display device is also the same as in FIG. 9.

Referring to FIG. 1, the lower frame 40 accommodating the backlight is formed from aluminum to have a thickness of nearly 1 mm. This is because, in addition to accommodating the backlight, the lower frame 40 has a role of a heat release plate to release heat that originates from LEDs. The middle frame 30 and upper frame 10 in FIG. 1 are both formed of nearly 0.3 mm thick stainless steel or iron, in order to keep the liquid crystal display device lightweight.

Figure 2:
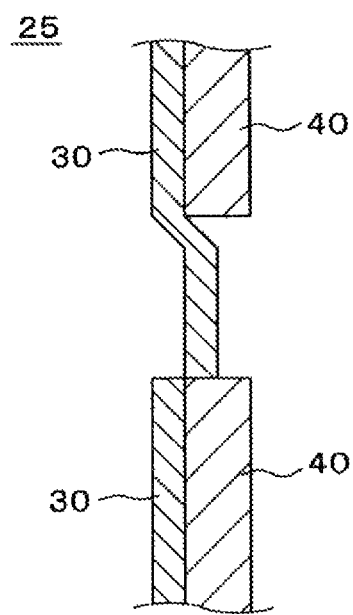
FIG. 2 is a sectional view showing an example of snap fitting.

Referring also to FIG. 1, the middle frame 30 and the lower frame 40 are assembled by snap-fitting not shown in FIG. 1. FIG. 2 is a sectional view of the snap-fit section 25. The lower frame 40 in FIG. 2 is formed with a hole on one side face beforehand. When a cut is formed on one side of the middle frame 30 and this frame is bent inward at one section thereof, this bent section fits into the above hole to join the middle frame 30 and the lower frame 40 together. The middle frame 30 and the upper frame 20 are likewise assembled using substantially the same snap-fit section 25 as used in FIG. 2.

One of the most significant differences between FIG. 1 and FIG. 8 which shows the conventional example exists in a shape of the light guide plate 10. Referring to FIG. 1, a protrusion 11 is formed at an end portion of the light guide plate 10. A clearance from a front end of the protrusion 11 of the light guide plane 10 to an inner surface of the middle frame 30 is smaller than an upper surface of the optical sheets 18 and an inner surface of the middle frame 30. That is to say, even if the light guide plate 10 thermally expands and comes into contact with the middle frame 30, one optical sheets 18 do not come into contact with the middle frame 30. This prevents the middle frame 30 from holding down the edges of the optical sheets 18 and thus from deforming the optical sheets 18 into a corrugated form. In short, nonuniformity of luminance on a display screen due to such deformation of the optical sheets 18 is suppressed.

Even if the thermal expansion of the light guide plate 10 pushes a flange section of the middle frame 30 upward, since a cushioning spacer 70 is disposed between the liquid crystal display panel and the middle frame 30, the cushioning spacer 70 flexibly collapses and does not stress the liquid crystal display panel.

Figure 3A:
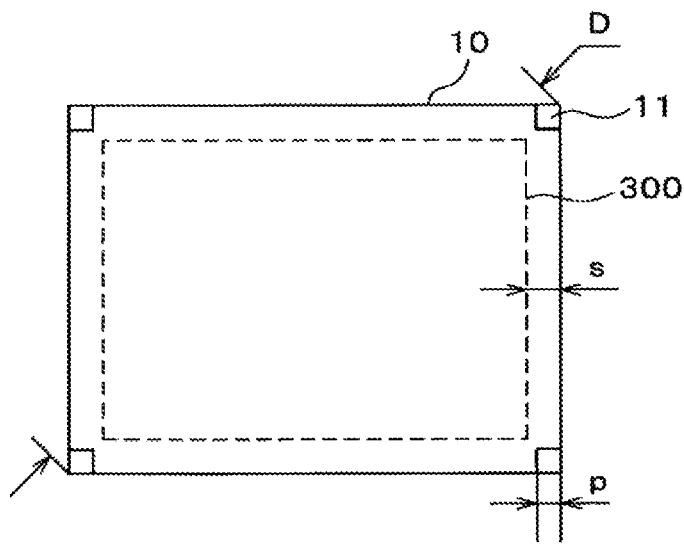
FIGS. 3A-3C are detailed views of a light guide plate according to the invention.
Figure 3C:
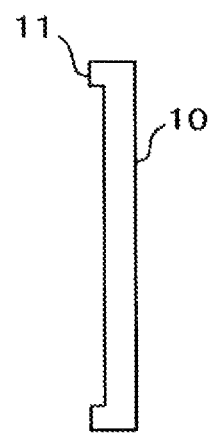
Figure 3B:
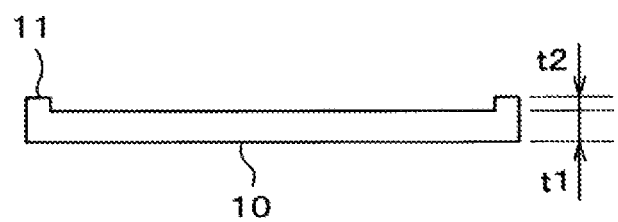
Figure 4:
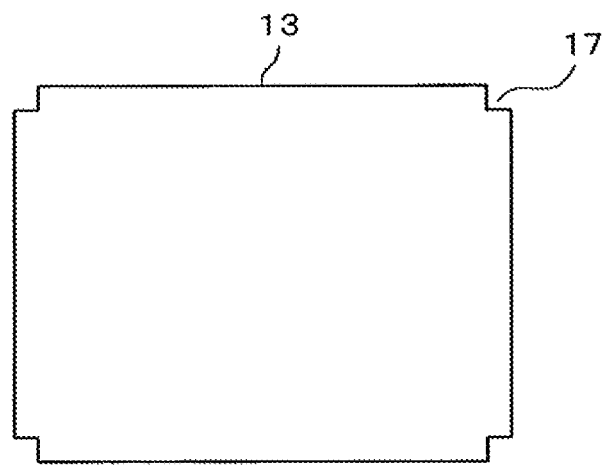
FIG. 4 shows an example of a group of optical sheets that becomes engaged with the light guide plate of FIGS. 3A-3C.

FIGS. 3A-3O show an exemplary shape of the light guide plate 10 that is one feature of the present invention. FIG. 3A is a plan view of the light guide plate 10, FIG. 3B is a side elevation showing a long side of the light guide plate 10, and FIG. 3C is a side elevation shoving a short side of the light guide plate 10. The light guide plate 10 shown in FIGS. 3A-3C has a feature in that the protrusion 11 is formed at four corners. The optical sheets 18 to be mounted on the light guide plate 10 have a shape that avoids the protrusions 11 formed at the four corners of the light guide plate 10. FIG. 4 is a plan view of a lower diffusion sheet 13 that is a portion of the optical sheets 18. As shown in FIG. 4, the lower diffusion sheet 13 is notched at four corners to mate with the protrusions 11 at the four corners of the light guide plane 10.

Figure 5:
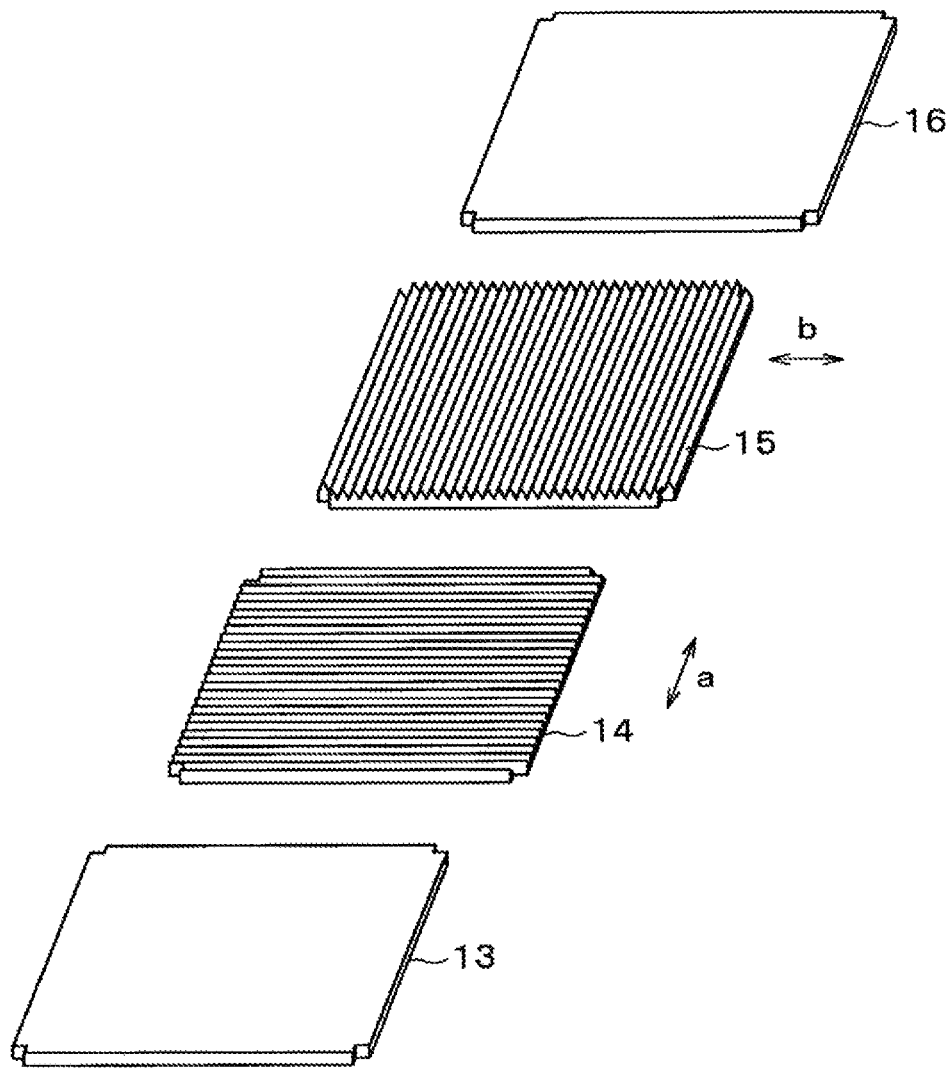
FIG. 5 is a perspective view of the optical sheets.

Referring back to FIGS. 3A-3C, when the light guide plate 10 has a diagonal dimension D of, for example, 4 inches wide across one corner, the light guide plate 10 is of the following dimensions, for example. The protrusions 11 at the four comers have a square plans that measures, as shown, in FIG. 3A, between 0.5 mm and 1.0 mm in length "p" of one side, and as shown in FIG. 3B, nearly 1.0 mm in height "t2" of the protrusion 11. The light guide plate 10 itself has a thickness "s" of nearly 3.0 mm. A display region 300 is formed internally to the protrusions 11, and a spatial clearance "s" from an edge of the light guide plate 10 to that of the display region 300 is 2.0 mm, for example, FIG. 5 is a perspective view showing an example of the optical sheets 18. The optical sheets 18 comprise a lower diffusion sheet 13, a lower prism sheet 14, an upper prism sheet 15, and an upper diffusion sheet 16, which ere mounted in this order on the light guide plate 10. The lowest sheet in FIG. 5 is the lower diffusion sheer 13. Light that exits the light guide plate 10 and heads towards the liquid crystal display panel has slight nonuniformity of brightness in that the light is, for example, relatively bright near the LEDs and dark at sections distant from the LEDs or between one LED and another LED. The lower diffusion sheet 13 alleviates such nonuniformity of brightness to form the backlight of uniform luminance.

The lower prism sheet 14 is overlaid upon the lower diffusion sheet 13. As shown in FIG. 5, the lower prism sheet 14 includes prisms that are triangular in section, and these prisms extend in a longitudinal direction and are arrayed in a lateral direction. The prisms are pitched at nearly 50 µm. The fewer prism sheet 14 functions to raise utilization efficiency of the light by, as shown in FIG. 5, orienting it in a vertical direction of the lower prism sheet as the light attempts spreading in a direction of "a".

Figure 6:
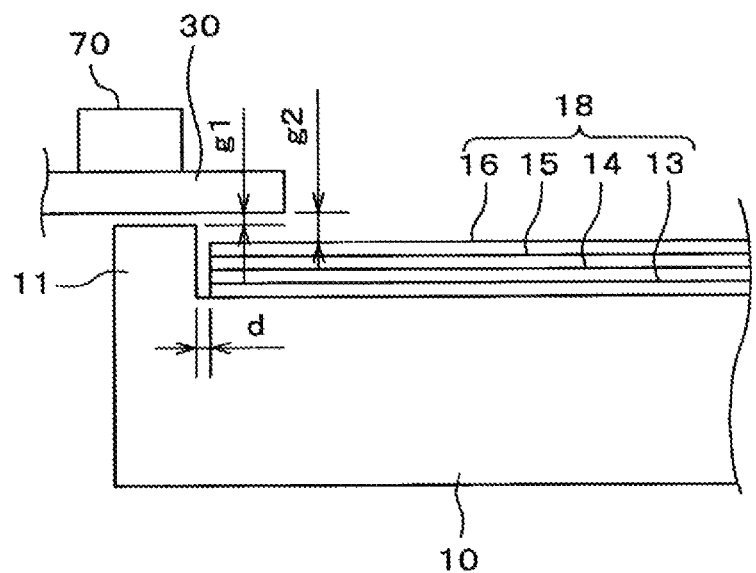
FIG. 6 is a sectional view that shows essential elements of the invention.

The upper prism sheet 15 is overlaid upon the lower prism sheet 14. As shown in FIG. 6, the upper prism sheet 15 includes prisms that are triangular in section, and these prisms extend in a longitudinal direction, and are arrayed in a lateral direction. The prisms are pitched at nearly 50 cm. The upper prism sheet 15 functions to raise utilization efficiency of the light by, as shown in FIG. 5, orienting it in a vertical direction of the upper prism sheet as the light attempts spreading in a direction of "b".

Referring to FIG. 5, the upper diffusion sheet 16 is overlaid upon the upper prism sheet 15. The upper diffusion sheet 16 works to suppress occurrence of moiré on the screen of the liquid crystal display device. That is to say, microscopically the brightness of the light which has exited the lower prism sheet 14 or the upper prism sheet 15 is periodically changing according to the particular arrayal pitch of the prisms.

Meanwhile, scan lines extend in a lateral direction, for example, and are arrayed in, for example, a longitudinal direction on the TFT substrate 100 of the liquid crystal display panel. Therefore, a section that periodically transmits the light in the longitudinal direction, and a section that acts as a shield against the light, occur according to the particular scan line. Image signal lines also extend in the longitudinal direction and are arrayed in the lateral direction on the TFT substrate 100 of the liquid crystal display panel. Therefore, a section that periodically transmits the light in the lateral direction, and a section that acts as a shield against the light, occur according to the particular image signal line.

Interference of light then occurs between the light that has passed through the lower prism sheet 14 and the upper prism sheet 15, and the scan lines or image signal lines on the TFT substrate 100 of the liquid crystal display panel, and moiré, occurs as a result. The upper diffusion sheet 16 has a role to alleviate the interference with the scan lines or image signal lines on the TFT substrate 100, by alleviating an intensity level of the light which has passed through the prism sheets, and thus suppress the occurrence of moiré. The upper diffusion sheet 16 is omitted if the moiré does hot become a problem. The lower diffusion sheet 13 and the upper diffusion sheet 16 are, for example, 140 µm thick, and the lower prism sheet 14 and the upper prism sheet 15 are, for example, 155 µm thick.

The optical sheets in FIG. 5 are only shown as an example, and in another example, the upper diffusion sheet may be replaced by a DBEF (Dual Brightness Enhancement Film). The DBEF first reflects light, whose phase differs from that of a direction in which a lower polarizer transmits the light, and then the DBEF once again reflects the light via optical parts provided below, and causes the light to pass through for enhanced light utilization efficiency of the backlight. The DBEF has a thickness off for example, between 280 μm and 400 μm.

In yet another example of optical sheets used in a vehicular liquid crystal display device, a so-called louver film may be used that imparts directivity to the light emitted from the display.

FIG. 6 is an enlarged sectional view that shows essential elements of the present invention, this sectional view representing a relationship between the light guide plate 10, the optical sheets 18, and the middle frame 20. Referring to FIG. 6, the optical sheets 18 are mounted on the light guide plate 10. The optical sheets 10 comprise the lower diffusion sheet 13, the lower prism sheet 14, the upper prism sheet 15, and the upper diffusion sheet 16, The protrusion 11 is formed at an edge of the light guide plate 10, and height of the protrusion 11 is greater than total thickness of the optical sheets 18. A horizontal clearance "d" between the optical sheets 18 and the protrusion 11 of the light guide plate 10, in FIG. 6, is the clearance between the notches 17 of the optical sheets 18 and the protrusion 11 of the light guide plate 10, and "d" is a dimensional margin provided, so that the optical sheets 18 are easily mounted on the light guide plate 10.

A spatial gap g1 between the protrusion 11 of the light guide plate 10 and a lower surface or the middle frame 30 is nearly between 0.05 mm end 0.20 mm. This clearance is of such a level that the light guide plate 10 does not shift in position within the lower frame 40, even under a normal state. A spatial gap g2 between the lower surface of the middle frame 30 and the upper surface of the optical sheets 18 is nearly 0.2 mm. However, g2>g1 always holds. In other words, the upper surface of the optical sheets 18 are always lower than the front end of the protrusion 11 of the light guide plate 10.

Figure 7:
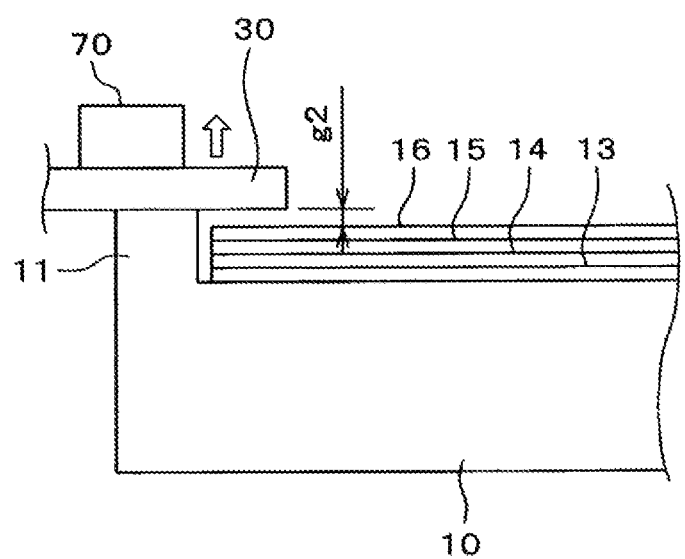
FIG. 7 is a sectional view that shows the essential elements of the invention under a thermally expanded state.

FIG. 7 shows a case in which the LEDs raise a temperature of the parts of the backlights and bring the protrusion 11 of the light guide plate 10 and the middle frame 30 into contact. In this case, the upper surface of the optical sheets 13 is also lower than the front end of the protrusion 11 of the light guide plate 10, so the problem can be avoided that as in the conventional device, the fight guide plate 10 might, press the optical sheets 18 against the middle frame 30, deform the optical sheets 18 into a corrugated form, and cause the nonuniformity of luminance on the screen.

If the light guide plate 10 thermally expands too much, this pushes the middle frame 30 upward as denoted by a white arrow, but since the cushioning spacer 70 present on one middle frame 30 is formed from a spongy material to readily become collapsed by compressive force, no stress is applied to the liquid crystal display panel mounted on the cushioning spacer 70.

In this way, in accordance with the present invention, since the protrusion 11 is formed at the four corners of the light guide plate 10, even when a temperature of the backlight rises for reasons such as heat from the LEDs, the nonuniformity of luminance due to the deformation of the optical sheets 18 as a result of their edges becoming sandwiched between the middle frame 30 and the light guide plate 10 can be prevented from occurring. In addition, since the gap between the middle frame 30 and the protrusion 11 of the light guide plate 10 can be reduced to a small level, the movement of the light guide plate 10 due to vibration can be prevented and unusual sounds due to the movement of the light guide plate 10 under vibration of the liquid crystal display device can be prevented from occurring.

What is claimed is:

1. A liquid crystal display device comprising a liquid crystal display panel and a backlight, wherein:
   the backlight includes a light guide plate and a group of optical sheets which are disposed within a lower frame, the optical sheets being mounted on the light guide plate, the backlight including a middle frame covering an edge of the optical sheets and that of the light guide plate;
   the light guide plate is rectangular and formed with a protrusion at each of four comers thereof; and
   a spatial gap g1 between a front end of each protrusion of the light guide plate and a lower surface of the middle frame is smaller than a spatial gap g2 present between an upper surface of the optical sheets and the lower surface of the middle frame.

2. The liquid crystal display device according to claim 1, wherein the optical sheets are each notched at positions corresponding to the protrusions formed at the corners of the light guide plate.

3. The liquid crystal display device according to claim 2, wherein the gap between the front end of the protrusion of the light guide plate and the lower surface of the middle frame is 0.05 to 0.20 mm.

4. The liquid crystal display device according to claim 1, wherein the liquid crystal display panel is mounted on the middle frame via a cushioning spacer.

* * * * *

UNITED STATES PATENT AND TRADEMARK OFFICE
CERTIFICATE OF CORRECTION

PATENT NO. : 9,025,106 B2
APPLICATION NO. : 14/107382
DATED : May 5, 2015
INVENTOR(S) : Hiroyuki Miyazaki It is certified that error appears in the above-identified patent and that said Letters Patent is hereby corrected as shown below:

IN THE SPECIFICATION
Column 1, line 6, change "Dec. 20, 2013" to --Dec. 20, 2012--;
Column 1, line 40, change "it swelling" to --if swelling--;
Column 1, line 43, change "stare" to --state--;
Column 2, line 13, change "FIG. 6" to --FIG. 8--;
Column 2, line 15, change "forced" to --formed--;
Column 2, line 18, change "or the display" to --of the display--;
Column 2, line 47, change "light guide place 10" to --light guide plate 10--;
Column 2, line 52, change "so the liquid" to --to the liquid--;
Column 3, line 23, change "optical sheets 10" to --optical sheets 18--;
Column 3, line 37, change "optical sheets 16" to --optical sheets 18--;
Column 3, line 45, change "A liquid crystal display device" to --(1) A liquid crystal display device--;
Column 4, line 10, change "iron; moving" to --from moving--;
Column 4, line 43, change "he" to --be--;
Column 5, line 3, change "upper frame 10" to --upper frame 20--;
Column 5, line 21, change "light guide plane 10" to --light guide plate 10--;
Column 5, line 25, change "one optical sheets 18" to --the optical sheets 18--;
Column 5, line 38, change "3A-30" to --3A-3C--;
Column 5, line 42, change "shoving" to --showing--;
Column 5, line 51, change "light guide plane 10" to --light guide plate 10--;
Column 5, lines 55-56, change "four comers" to --four corners--;
Column 5, line 56, change "plans" to --plane--;
Column 5, line 56, change "as shown, in FIG. 3A" to --as shown in FIG. 3A--;
Column 5, line 59, change "thickness "s"" to --thickness t1--;
Column 5, line 67, change "ere mounted" to --are mounted--;
Column 6, line 2, change "lower diffusion sheer 13" to --lower diffusion sheet 13--;
Column 6, lines 14-15, change "fewer prism sheet 14" to --lower prism sheet 14--;
Column 6, line 56, change "does hot" to --does not--;
Column 6, line 64, change "light, whose" to --light whose--;

Signed and Sealed this
First Day of December, 2015

Michelle K. Lee
*Director of the United States Patent and Trademark Office*

CERTIFICATE OF CORRECTION (continued)
U.S. Pat. No. 9,025,106 B2

IN THE SPECIFICATION
Column 7, line 2, change "off for example" to --of, for example--;
Column 7, line 13, change "optical sheets 10" to --optical sheets 18--;
Column 7, line 15, change "upper diffusion sheet 16," to --upper diffusion sheet 16.--;
Column 7, line 25, change "lower surface or" to --lower surface of--;
Column 7, line 26, change "0.05 mm end 0.20 mm" to --0.05 mm and 0.20 mm--;
Column 7, line 38, change "optical sheets 13" to --optical sheets 18--;
Column 7, line 41, change "fight guide plate 10 might," to --light guide plate 10 might--;
Column 8, lines 1-2, change "one middle frame 30" to --the middle frame 30--; and
IN THE CLAIMS
Claim 1, column 8, line 29, change "comers" to --corners--.